Oct. 21, 1952 H. L. GIWOSKY 2,614,554
FLOOR FURNACE
Filed May 22, 1948 4 Sheets-Sheet 1

Inventor:
Harry L. Giwosky,
By Dawson, Ormsbee & Maugarley
Attorneys.

Oct. 21, 1952 — H. L. GIWOSKY — 2,614,554
FLOOR FURNACE
Filed May 22, 1948 — 4 Sheets-Sheet 2

Inventor:
Harry L. Giwosky,
By Dawson, Ooms, Bretting & Spangenberg,
Attorneys.

Oct. 21, 1952 H. L. GIWOSKY 2,614,554
FLOOR FURNACE
Filed May 22, 1948 4 Sheets-Sheet 3
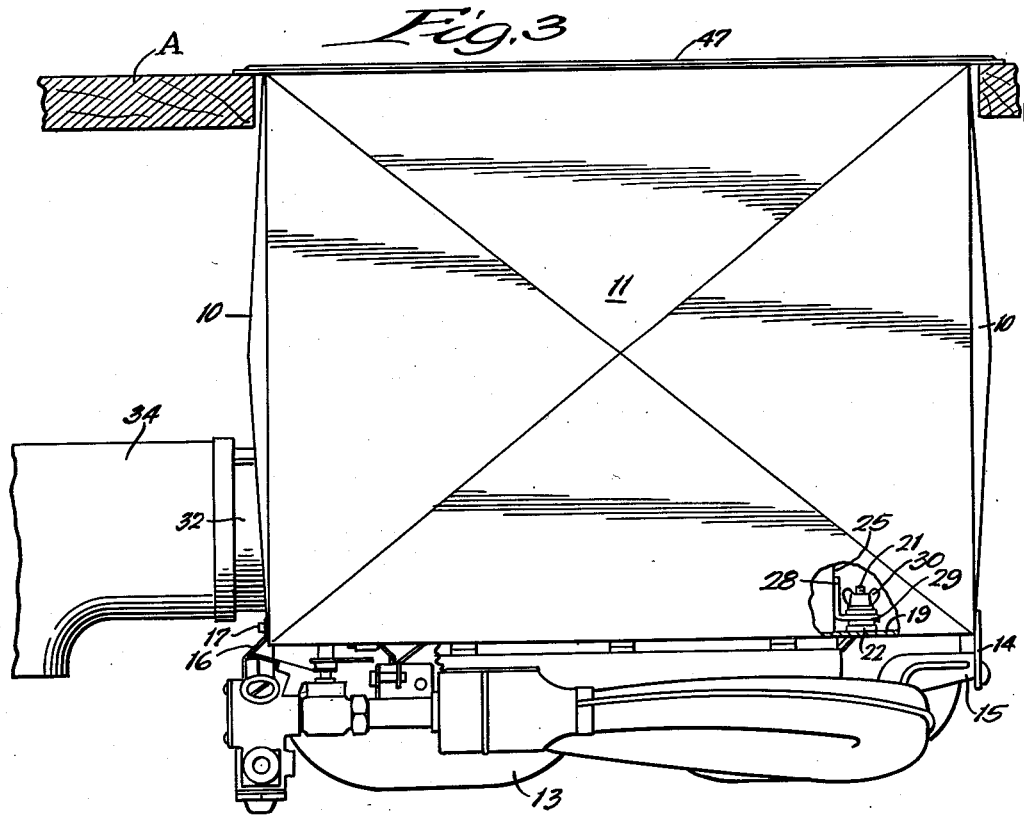
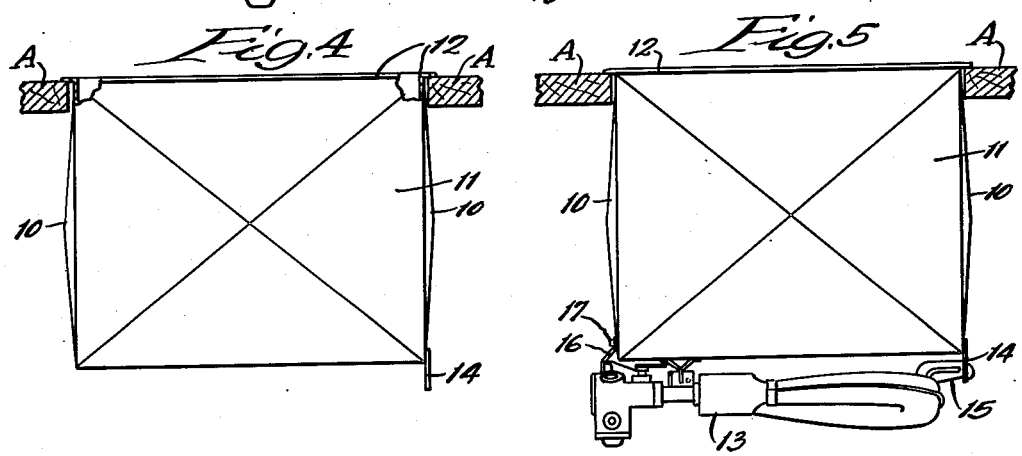
Inventor:
Harry L. Giwosky,
By Dawson, Ormsby, Booth & Spangenberg,
Attorneys.

Oct. 21, 1952  H. L. GIWOSKY  2,614,554
FLOOR FURNACE
Filed May 22, 1948  4 Sheets-Sheet 4
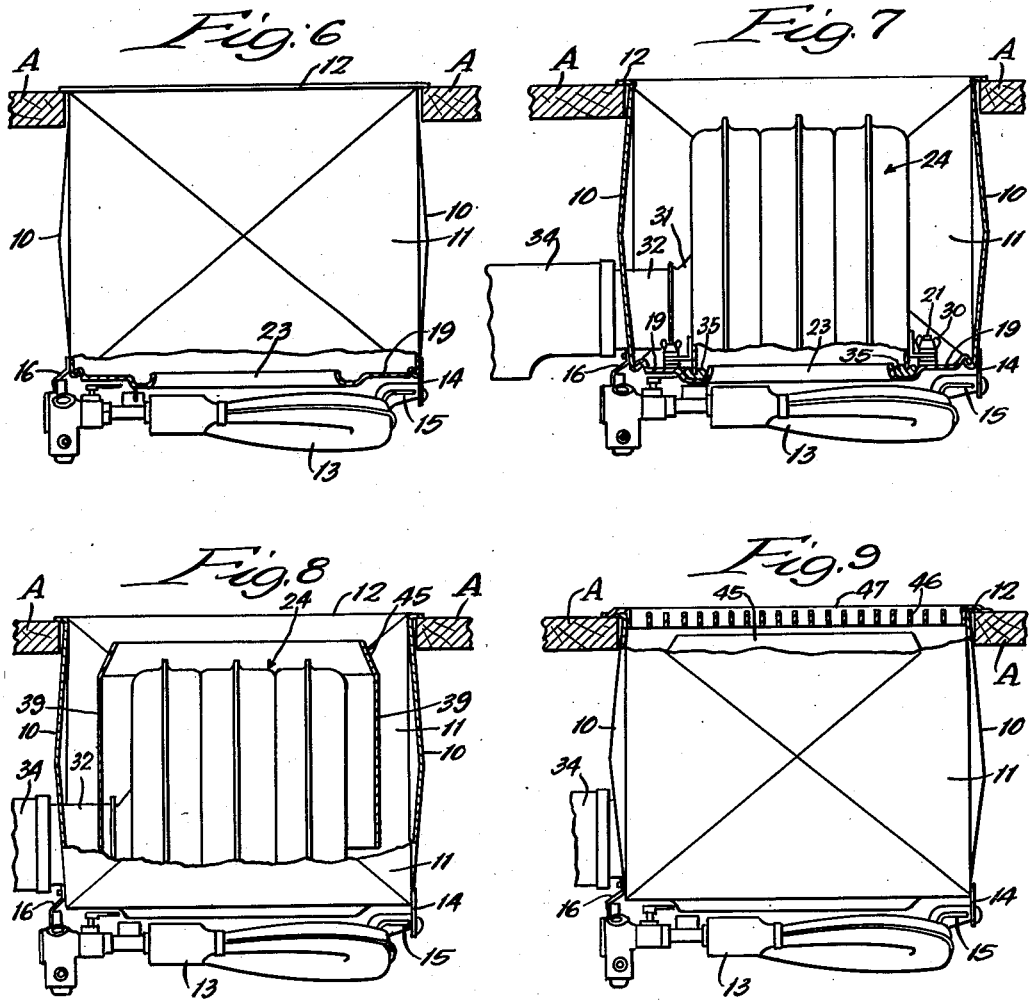

Patented Oct. 21, 1952

2,614,554

UNITED STATES PATENT OFFICE 2,614,554

FLOOR FURNACE

Harry L. Giwosky, Wichita, Kans., assignor to The Coleman Company, Inc., Wichita, Kans., a corporation of Kansas Application May 22, 1948, Serial No. 28,671

6 Claims. (Cl. 126—116)

This invention relates to a floor furnace. Features of the invention, however, are applicable to other uses.

An object of the invention is to provide a floor furnace which may be set into position within a floor opening from the floor above, panels, burner, the combustion chamber casing, and liners, etc., all being introduced from the floor above and supported within the floor opening. Yet another object is to provide a floor furnace formed of separate parts which permit installation in a convenient sequence for accurate assembly of a sturdy, complete structure. Yet another object is to provide a floor furnace structure which may be installed by one lying or sitting on the floor above, the structure being formed of separate parts which may be united in a predetermined sequence for quick assembly of the completed structure. A still further object is to provide a floor furnace of shallow depth which occupies relatively small space below the floor and in which the burner is supported above the water line while at the same time having an increased efficiency as a heating unit. Yet another object is to provide a floor furnace structure having separable parts united in a sturdy structure by a minimum of connections and permitting rapid disassembly and removal of parts for repair or replacement. A further object is to provide in a floor furnace effective heating means in which the flow of combustion gases are utilized for increased efficiency in heat transfer to the air streams. Other specific objects and advantages will appear as the specification proceeds.

The invention is illustrated, in a single embodiment, by the accompanying drawings, in which—

Figure 1:
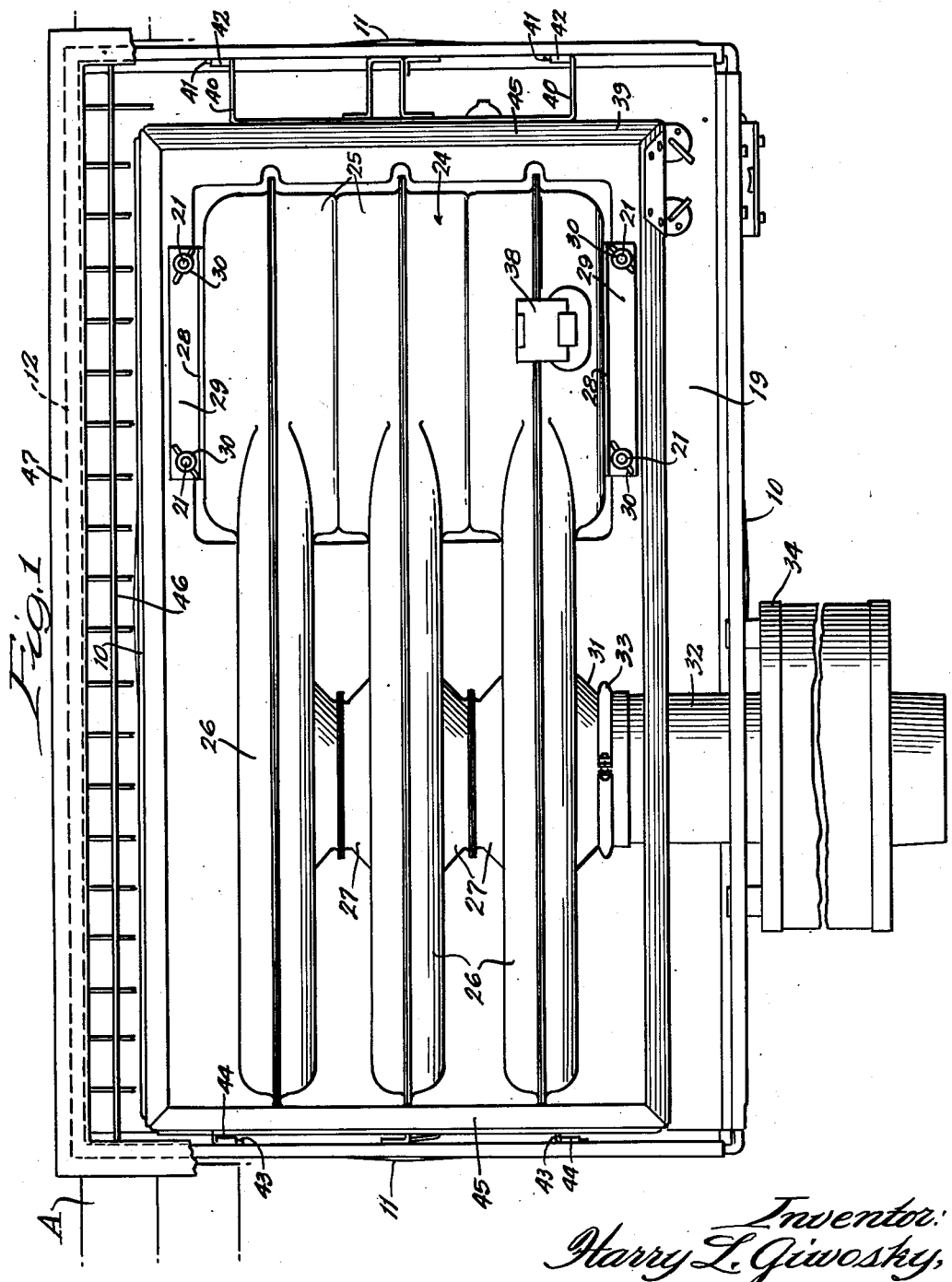
Figure 2:
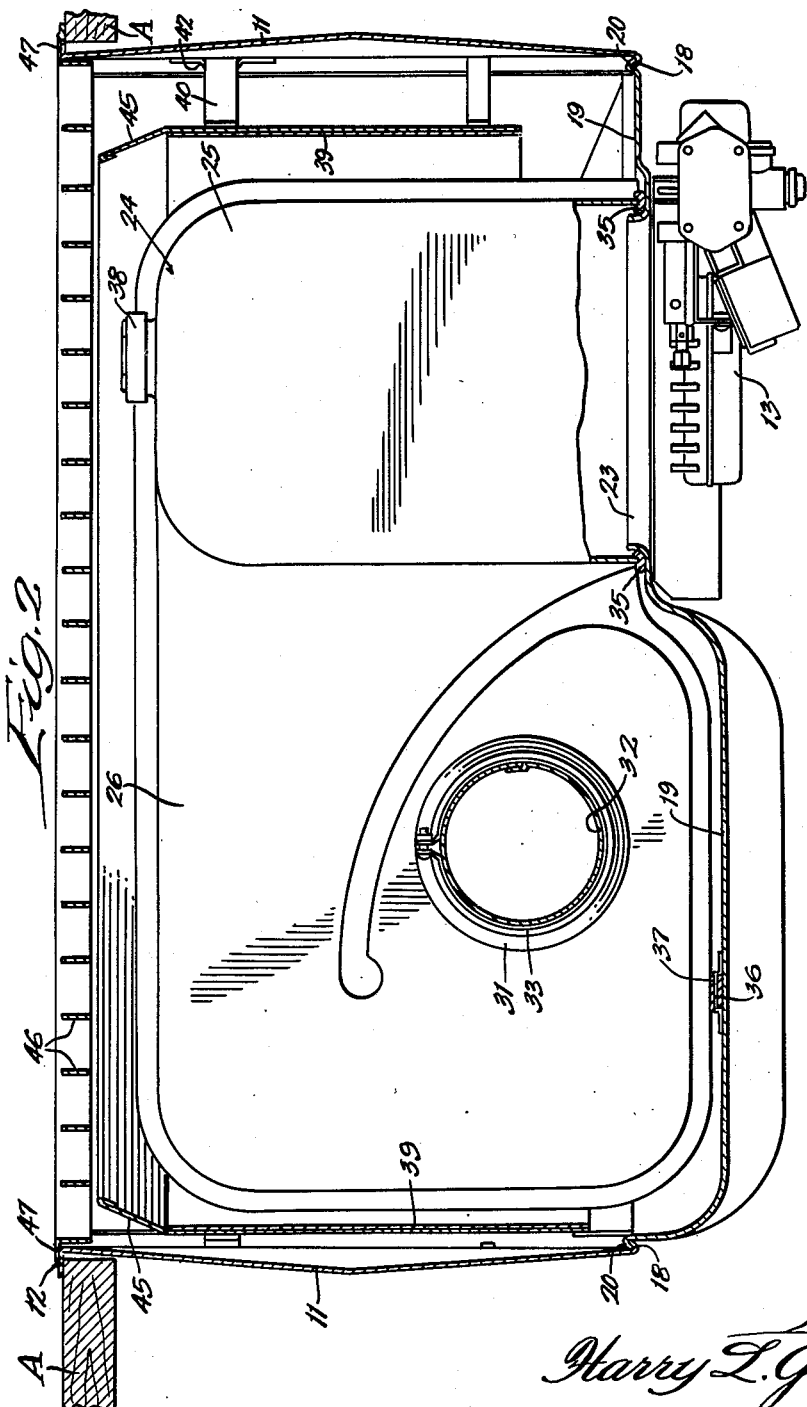

Fig. 1 is a broken top plan view of structure embodying my invention; Fig. 2, a vertical sectional view; Fig. 3, a broken end view in elevation; Fig. 4, a broken end view on a reduced scale showing the first step in the assembly operation; Fig. 5, a view similar to Fig. 4 but showing a second step in the assembly operation; Fig. 6, a broken end view showing a third step in the assembly operation; Fig. 7, a transverse sectional view showing a fourth step in the assembly operation; Fig. 8, a broken transverse sectional view showing a fifth step; and Fig. 9, a broken transverse sectional view showing a final step in the assembly operation.

In the illustration given, A designates a floor having an opening cut therethrough.

Suspended within the floor opening which is preferably of rectangular shape, are casing side panels. Since the opening in the illustration given is rectangular, the longer side panels will be designated by the numeral 10 while the end panels will be designated by the numeral 11. Each of the panels is equipped at its top with a laterally extending flange 12 which rests upon the floor edge. By this means, the panels are suspended within the opening. The panels may be of any suitable type, shape or material. In the specific illustration given, the panels are somewhat concave in shape with the central portion of the wall extending farther in an outward direction than the peripheral portions of the panel.

After the four panels have been suspended upon the floor edge about the opening and while the bottom of the casing thus formed is open, I prefer to introduce the burner 13 and support it upon the side panels 10. In the specific illustration given, one of the side panels 10 is provided with a metal strap 14 having an opening therein for receiving the lug 15 with which the burner 13 is provided at one end. The other end of the burner 13 is connected to the opposite panel 10 by a metal strap 16 having one end welded to the burner and the other end having an opening which slips over a pin or screw 17 carried by the last mentioned panel. The burner may be of any suitable type or construction and may be used for burning any desired type of fuel. The burner illustrated is of known construction and a detailed description is believed unnecessary.

The end panels 11 and side panels 10 are crimped upwardly at their lower edges to form retaining flanges 18. In the next preferred step of the assembly operation, I introduce a bottom wall or panel 19 having its ends and sides provided with downwardly turned hooks or flanges 20 which interlock with the retaining flanges 18. The bottom wall 19 is provided on each side with a pair of screw members 21 anchored within a strip 22 welded to the bottom wall, as shown more clearly in Figs. 1 and 3. The bottom wall 19 is provided with an opening aligned with the burner 13 and about the opening the metal is turned upwardly to form a neck or collar 23. Preferably bottom wall 19 is provided with an upwardly offset portion about collar 23 to provide a raised seat for the combustion chamber.

In the next step of assembly, I prefer to introduce the combustion chamber casing 24. The casing, as shown more clearly in Figs. 1 and 2, comprises a section 25 fitting above the collar 23 and, extending laterally therefrom are the radiators 26.

The radiators are connected by the conduit casings 27. The casing section 25 is provided on each side near its lower edge with a pair of metal straps 28 having laterally turned flanges 29. The flanges 29 are apertured to receive the screws 20. Washers are placed on opposite sides of the flange 29 and a wing nut 30 is employed for securing each flange 29 upon its screw 21, as shown more clearly in Fig. 3.

The casing 24 is provided on one side with an outlet flue 31 in which is received a pipe section 32. A clamp ring 33 is employed for tightening the flue section 31 about the pipe 32. The pipe section 32 enters a flue outlet box 34 which may be of any suitable type of structure and which may, if desired, be provided with an outlet in the lower portion thereof to take care of back surges, etc. It will be understood that any suitable form of outlet conduit or structure may be employed. Within the combustion chamber casing any suitable baffle means may be employed for directing the flue gases along the entire length of the casing structure before the gases are allowed to escape through the outlet pipe 31, thus utilizing the gases efficiently for the transfer of heat to the air currents circulating about the casing 24.

In order to seal the combustion chamber casing tightly about the collar 23, I provide a strip 35 of sealing material, such as asbestos, etc., about the collar, as shown more clearly in Fig. 2, and the lower edges of the casing portion 25 are embedded within the sealing material by the thrust of the wing nuts 21 against the flanges 29. Also, if desired, the radiator portion of the casing 24 may be supported upon an insulating strip 36 mounted upon a bracket 37.

The casing 25 may be provided with an opening at its top normally covered by a pivoted closure 38. The closure may be lifted so that a lighted match on a suitable holding wire or rod may be extended therethrough and onto the burner.

About the combustion chamber casing 24 and spaced therefrom is a liner 39 and the liner is preferably supported by means of bracket arms carried at the ends of the liner, as shown more clearly in Figs. 1 and 2. At one end, the liner 39 is provided with end bracket arms 40 which have inwardly turned ends 41 extending through metal loops 42 carried by the end panels 11. Similarly, the opposite end of the liner 39 is provided with hooked arms 43 engaging loops 44 carried by the opposite panel 11. It will be understood that any suitable means for supporting the liner 39 upon the panels may be employed. The liner 39 is preferably provided at its top with an inwardly turned outlet flange 45.

The opening in the floor may next be closed by a grille 46 having flanges 47 extending partially over the flanges 12 of the panels. In the particular illustration given, a flat grille or register is shown. If desired, the register may be formed in a variety of shapes. For example, if the floor opening extends between two rooms with a wall therebetween, two grilles may be employed at an inclination and on either side of the wall for providing outlets for the air into each of the rooms. For the purpose of the present invention, a single flat grille is believed to be sufficiently illustrative.

The sequence of steps employed in the assembly of the complete structure may be varied as desired. I have found that very satisfactory results are obtained when a sequence such as is illustrated in Figs. 4 to 9 inclusive is employed. In the first step, illustrated in Fig. 4, the side panels 10 and the end panels 11 are placed in position by seating their flanges 12 along the floor edge about the opening. The side and end panels are individually placed in position and hang free in suspended relation from the floor edge. The bottom of the casing thus formed is still open. In the next step, illustrated in Fig. 5, the burner 13 is introduced through the casing opening and the lug 35 at the rear of the burner placed within the aperture of the metal strap 14. The opposite end of the burner is supported by bringing the strap 16 with its aperture over the stud or pin 17. If desired, screws and bolts may be employed for securing the apertured end of the strap 16 to the lower edge of the side panel 10. It will be understood that any number of supporting lugs 15 and straps 16 may be employed to provide a sturdy support for the burner 13. In the same operation, the fuel line to the burner may be connected. Preferably, the fuel line and the outlet flue will have been installed under the building prior to the assembly operation which is now being described.

In the next step, which is illustrated in Fig. 6, the bottom wall 19 is placed in position with the flanges 20 of the bottom wall engaging the inwardly and upwardly turned panel flanges 18. The interlocking of these flanges in the angular position illustrated securely unites the end panels 11 and these, together with the side panels which have already been joined by the burner connections as illustrated, form a sufficiently tight furnace casing. The small quantity of air which can enter at the corners of the casing is not objectionable, since it is warmed by the heat radiation unit and merely serves to provide fresh air. If it is desired to make the casing more nearly airtight the abutting edges of the side and end panels can be loosely interlocked by means of hook flanges like flanges 18 and 20.

In the next operation, which is illustrated in Fig. 7, the combustion chamber casing 24 is placed in position and the wing nuts 30 are tightened to secure the flanges 29 upon the screws 21 fixed to the bottom wall 19. The pipe section 32 is advanced laterally through the side panel 10 and into the outlet flue box 34 which has previously been installed.

In the next operation, shown in Fig. 8, the liner 39 is secured in position by attaching the bracket arms thereon to the brackets on panels 11, as illustrated more clearly in Fig. 1.

The final assembly step is shown in Fig. 9 in which the flat grille 46 is placed in position over the flanges 12 of the panels. The panel 14 may be of any suitable type or construction. It may be formed in segments and it may have a removable section vertically aligned with the closure 38 which is to be opened for the lighting of the burner.

It will be apparent that a floor furnace constructed in accordance with this invention can be disassembled by merely following the reverse of the assembly steps just described. Thus, the construction described not only facilitates the shipping of the floor furnace from the factory and its assembly on the site at which it is to be used, but also facilitates its maintenance while in service. Floor furnaces of this type tend to collect a large amount of dirt and require frequent cleaning of the parts. Also, it is necessary at frequent intervals to adjust the burner and valves associated therewith, or to make repairs on the burner or valves. With the structure provided by this invention, the furnace can be easily disassembled to any extent required for cleaning, adjusting, or repairing operations. By having the side and end panels separate the removal of the parts is facilitated, and particularly the removal of the floor and the burner. Also, access can be obtained to the space beneath the floor by merely removing one of the side or end panels, while leaving the other panels in place.

While in the foregoing specification, I have set forth much of the structure in great detail for the purpose of illustrating the invention, it will be understood that such details of structure may be varied widely by those skilled in the art without departing from the spirit of my invention.

I claim:

1. In a floor furnace, separate side and end panels equipped with flanges for suspending them from the floor to provide a furnace casing open at its bottom, a burner, cooperating members on said burner and an opposed pair of panels for suspending the burner from said opposed pair of panels, at least some of said panels being provided at their bottom with inwardly turned flanges, a bottom wall equipped with downwardly turned flanges supported on said inwardly turned flanges of the panels and having an opening aligned with said burner, a combustion chamber casing resting on said bottom wall and having its inlet communicating with said bottom opening, an outlet flue extending through the panel casing and communicating with said chamber, a liner supported by said panels about said casing, and a grille extending between the tops of said panels.

2. In a floor furnace, a pair of separate opposed side panels equipped with flanges for suspending them from the floor, a burner, cooperating members on said burner and side panels for suspending the burner from said side panels, a pair of separate flange-equipped end panels suspended from said floor between said first panels and having inwardly turned bottom flanges, one of said panels having a flue aperture, a bottom wall freely supported on said inwardly turned flanges and having an opening aligned with said burner, a combustion chamber casing resting on said bottom wall and having its inlet communicating with said bottom opening, an outlet flue communicating with said chamber and extending through said panel aperture, a liner about said casing, and a grille between the tops of said panels.

3. In a floor furnace, a pair of opposed separate side panels equipped with flanges for suspending them from a floor, a burner, means for suspending the burner from said side panels and below the panels, a pair of separate end panels equipped at their tops with outwardly turned flanges suspended from said floor between said first panels by means of said flanges and having inwardly and upwardly turned bottom flanges, a bottom wall having downwardly turned end flanges interlocking with said bottom panel flanges and having an opening aligned with said burner, a combustion chamber casing having its inlet communicating with said bottom wall opening, one of said panels having a flue aperture, an outlet flue communicating with said chamber and extending through said panel aperture, a liner releasably supported upon said panels about said casing, and a grille between the tops of said panels.

4. In a floor furnace, separate side and end panels equipped with flanges for suspending them from the floor to provide a rectangular furnace casing open at its bottom, a burner, means for suspending said burner upon said side panels after said panels are suspended from said floor, at least some of said panels being equipped with inwardly turned bottom flanges, a bottom wall having downwardly turned flanges supported on said inwardly turned flanges and having an opening aligned with said burner, one of said panels having a flue aperture, a combustion chamber casing resting on said bottom wall and having its inlet communicating with said bottom opening, an outlet flue communicating with said chamber and extending through said panel aperture, an opposed pair of said panels having brackets thereon, a liner extending about the casing and having supporting arms releasably engageable with said brackets, and a grille resting upon the top flanges of said panels.

5. In a floor furnace, a plurality of separate panels equipped at their top with laterally turned flanges for suspending them from the floor, said panels forming a furnace casing open at its bottom, a burner, means for suspending the burner from at least some of said panels after said panels are suspended from said floor, others of said panels being equipped with inwardly turned bottom flanges, a bottom wall supported on said inwardly turned flanges, said bottom wall having an opening aligned with the burner and an upwardly struck collar about the opening, sealing strips about the collar, a combustion chamber casing having an inlet opening and walls about the opening embedded in said sealing strips, an outlet flue communicating with said chamber and extending through one of said panels, a liner about said casing, and a grille between the tops of said panels.

6. In a floor furnace, a plurality of separate panels equipped at their top with laterally turned flanges for suspending them from the floor, said panels forming a furnace casing open at its bottom, a burner, means for suspending the burner from at least some of said panels after said panels are suspended from said floor, others of said panels being equipped with inwardly turned bottom flanges, a bottom wall supported on said inwardly turned flanges, said bottom wall having an opening aligned with the burner and an upwardly struck collar about the opening, sealing strips about the collar, a combustion chamber casing having an inlet opening and walls about the opening embedded in said sealing strips, an outlet flue communicating with said chamber and extending through one of said panels, a liner about said casing, and a grille between the tops of said panels, said combustion chamber casing being provided adjacent its bottom with laterally extending flanges, screws fixed to said bottom wall and extending through openings in said flanges, and wing nuts securing said flanges upon said screws.

HARRY L. GIWOSKY.

REFERENCES CITED

The following references are of record in the file of this patent:

UNITED STATES PATENTS

| Number | Name | Date |
|---|---|---|
| 1,415,234 | Gamble | May 9, 1922 |
| 1,591,889 | Schmitt | July 6, 1926 |
| 1,672,590 | Ward | June 5, 1928 |
| 2,200,645 | Stephens | May 14, 1940 |
| 2,387,939 | Olds | Oct. 30, 1945 |
| 2,475,737 | Campbell | July 12, 1949 |
| 2,491,664 | James | Dec. 20, 1949 |